(12) United States Patent
Tiesler et al.

(10) Patent No.: US 6,957,839 B1
(45) Date of Patent: Oct. 25, 2005

(54) OVERHEAD CONSOLE ASSEMBLY

(75) Inventors: John M. Tiesler, Harrison Township, MI (US); James R. Mestemaker, Lambertville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/950,087

(22) Filed: Sep. 24, 2004

(51) Int. Cl.[7] ................................................. B60J 7/00
(52) U.S. Cl. .................. 296/24.34; 296/37.8; 296/214; 224/311
(58) Field of Search ............................ 296/24.34, 37.7, 296/37.8, 214; 224/311

(56) References Cited

U.S. PATENT DOCUMENTS

| | | | | |
|---|---|---|---|---|
| 4,867,498 | A | * | 9/1989 | Delphia et al. ............ 296/37.7 |
| 6,065,793 | A | * | 5/2000 | Koshida et al. ............ 296/37.1 |
| 6,135,528 | A | * | 10/2000 | Sobieski et al. ........... 296/37.7 |
| 6,176,536 | B1 | * | 1/2001 | Miller et al. ............... 296/37.7 |
| 6,338,517 | B1 | * | 1/2002 | Canni et al. ............... 296/37.8 |
| 6,364,390 | B1 | * | 4/2002 | Finneman ................... 296/37.7 |
| 6,575,528 | B2 | * | 6/2003 | Tiesler et al. .............. 296/214 |
| 6,619,716 | B1 | * | 9/2003 | Sturt ........................ 296/37.8 |
| 6,669,260 | B2 | * | 12/2003 | Clark et al. ................ 296/37.8 |
| 6,749,244 | B1 | * | 6/2004 | Song ......................... 296/37.7 |
| 6,824,185 | B2 | * | 11/2004 | Tiesler et al. .............. 296/37.8 |
| 6,827,384 | B2 | * | 12/2004 | Anderson et al. .......... 296/37.8 |
| 2003/0075955 | A1 | * | 4/2003 | Tiesler et al. ............... 296/214 |

* cited by examiner

*Primary Examiner*—D. Glenn Dayoan
*Assistant Examiner*—Greg Blankenship
(74) *Attorney, Agent, or Firm*—Brooks Kushman P.C.

(57) ABSTRACT

An overhead console assembly and headliner combination for a vehicle includes a headliner having an upper surface, a lower surface and an elongated channel formed therein. An overhead console mounting arrangement securable to the headliner including opposing first and second rails having a rail extension and a power connector arrangement in communication with a vehicle electrical system. One or more accessory modules are selectively positionable and removably attachable to the opposing first and second rails with an accessory module mounting arrangement. The accessory module including a module housing, a door pivotally mounted to the housing and a storage area defined within the housing configured to receive and store items. The accessory module includes at least one electrical connector disposed on an outer surface of the module housing which engages the power connector arrangement on one of the opposing first and second rails to supply power to the accessory module.

20 Claims, 4 Drawing Sheets

OVERHEAD CONSOLE ASSEMBLY

BACKGROUND OF THE INVENTION

1. Field of the Invention

The present invention relates to an overhead console assembly having an electrical connector arrangement for use in the passenger compartment of a vehicle.

2. Background Art

Overhead consoles are commonly provided in the passenger compartment of a vehicle such as an automobile, boat or airplane. Overhead console assemblies are generally elongate structures disposed along the longitudinal axis of a headliner. The headliner includes an upper surface mounted to the interior roof structure of the vehicle and a lower surface having an overlay applied thereon. The overhead console is mounted to the lower surface of the headliner to provide additional storage space for items such as sunglasses, garage door openers and compact discs.

Current overhead console assemblies include a series of accessory compartments for storing items. The accessory compartments are pivotally mounted to the console to allow the passenger to stow and retrieve personal items from the compartment. One significant limitation of current overhead console assemblies is that the accessory compartments cannot be repositioned without a complete rebuild of the console. Fixed accessory compartments restrict repositioning of the compartments based on passenger preference. Another limitation is that stored items must be removed from the accessory compartments to transport the items between the vehicle and another location. It would be advantageous to provide an overhead console assembly for a vehicle having modular accessory compartments easily positionable on the headliner of the vehicle.

Overhead consoles assemblies frequently include electrical components, such as overhead lighting fixtures, vehicle controls for the radio and air conditioning systems, electronic components, such as compasses and temperature displays and video monitors. These electrical components must be preinstalled in the console prior to assembling the console to the headliner. If electrical components malfunction, the entire overhead console must be removed to repair the component. Further, the position of each electrical component cannot be varied to passenger requirements.

It would be advantageous to provide an overhead console assembly having electrical connections to supply power to a variety of modular electrical components. It would be further advantageous to provide an overhead console assembly having a pair of mounting rails disposed within a channel in the headliner to hide the mounting arrangement for removable accessory modules from view in the passenger compartment of a vehicle.

SUMMARY OF THE INVENTION

The present invention overcomes the above-referenced problems associated with prior overhead console assemblies by providing an overhead console assembly configured for use in the passenger compartment of a vehicle. The overhead console assembly includes a headliner having an upper surface attachable to a vehicle roof, a lower surface facing the passenger compartment and an elongated channel formed therethrough.

An overhead console mounting arrangement having opposing first and second rails is securable to the elongated channel in the headliner. Each rail includes an extension and a power connector arrangement in communication with a vehicle electrical system configured to supply power to one or more removable accessory modules. Brackets cooperate with the headliner to support the first and second rails mounted on headliner.

One or more accessory modules are selectively positionable and removably attachable to the opposing first and second rails. The accessory modules include a module housing, a door pivotally mounted to the housing and a storage area defined within the housing configured to receive and store items. The accessory module includes at least one electrical connector disposed on an outer surface of the module housing which engages the power connector arrangement on one of the opposing first and second rails to supply power to the accessory module.

An accessory module mounting arrangement comprises a pair of latches extending from flanges on the module housing and corresponding snap clips disposed on the module housing mountable to the rail extensions. Each latch includes a connecting portion releasably securable to a snap clip to secure the accessory modules to the overhead console mounting arrangement.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
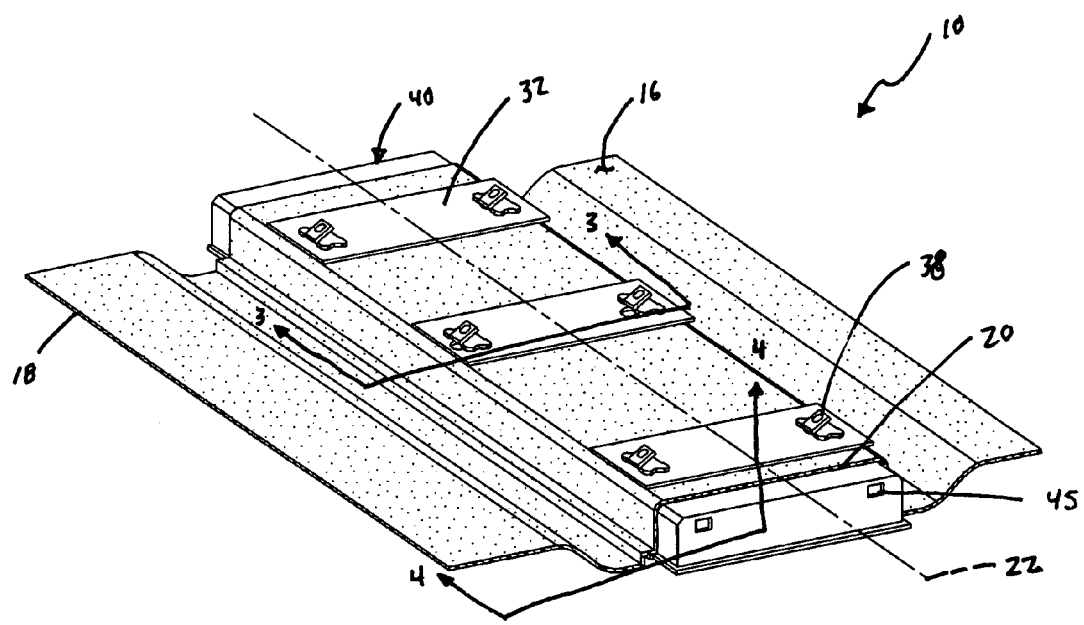
FIG. 1 is a perspective view of an overhead console assembly secured to the headliner of a passenger compartment of a vehicle in accordance with the present invention.

Certain terminology presented below is used for convenience in reference only and is not intended to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Figure 2:
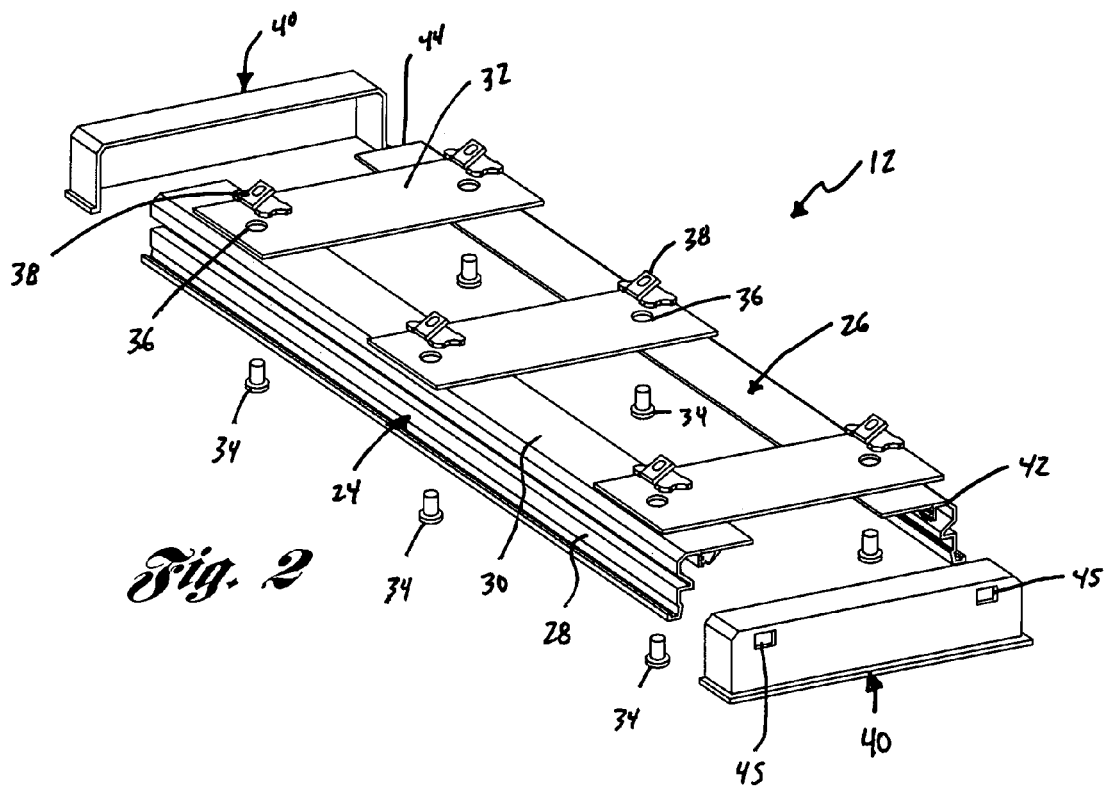
FIG. 2 is an exploded perspective view of the overhead console mounting arrangement configured for securement to a headliner.

Referring now to FIGS. 1 and 2, an overhead console assembly 10 for use in the passenger compartment of a vehicle is illustrated and disclosed. Assembly 10 includes an overhead console mounting arrangement, generally referenced by numeral 12, secured to a headliner 14. Headliner 14 comprises an upper surface 16 attached to the frame of a vehicle roof (not shown) and a lower surface 18 facing the passenger compartment of the vehicle.

A channel or indentation 20 is formed in the lower surface 18 of headliner 14 to receive console mounting arrangement 12. As shown in FIG. 1, channel 20 extends along the longitudinal axis 22 of the headliner 14. It is understood that one or more channels may be formed in the headliner in a variety of positions or orientations to receive one or more console assemblies. It is also understood that openings may be formed in the headliner to receive a variety of vehicle components, such as hooks, handles, lighting fixtures, electronic displays, switches for controlling sunroof, lighting and ventilation system functions and two-way vehicle communication devices that are well known in the art.

Headliner 14 is conventional in design and can be constructed in accordance with any known manner and may have any suitable configuration and comprise any suitable materials, such as any suitable natural materials and/or synthetic materials. Furthermore, the headliner body may include a single layer or multiple layer construction. The headliner body may also include a cover material or overlay (not shown), such as a polymeric material or fabric, applied to the lower surface 18 facing the interior passenger compartment of the vehicle. Headliner 14 is generally formed as a one-piece structure which extends above the interior passenger compartment of a vehicle. Channel 20 may be integrally formed into the lower surface 18 of headliner 14 using a variety of molding, forming or bending processes. Alternatively, the channel may be an opening created in the headliner to receive the console mounting arrangement.

Referring additionally now to FIG. 2, overhead console mounting arrangement 12 is described in greater detail. Overhead console mounting arrangement 12 comprises a pair of tracks or rails 24, 26 configured to receive and secured one or more removable accessory modules. Rails 24, 26 may have any suitable configuration for securement to the headliner 14 and may be formed by a variety of processes, including molding, extrusion or welding of multiple pieces. Rails 24, 26 are positioned in the channel 20 of headliner 14 to obscure the mounting arrangement 12 from view in the passenger compartment of the vehicle.

While the Figures illustrate a two piece rail construction, it is understood that a single piece rail having opposing cooperating surfaces may be used to accomplish the same objective. Rails 24, 26 are formed to fit within channel 20 in headliner 14. Rails may be formed and joined as multiple member sections as required by space requirements in the passenger compartment of the vehicle. For example, a single piece rail assembly may be required for the passenger compartment of a compact vehicle, while a multiple piece rail assembly may be necessary to support accessory modules in a sport utility vehicle passenger compartment.

Rails 24, 26 each include a substantially vertical sidewall 28 and an upper wall 30 extending generally perpendicular from the sidewall 28. Brackets 32 extending laterally above the channel 20 in headliner 14 are provided to support the longitudinally extending rails 24, 26. Fasteners 34 extending through apertures in the upper wall, the headliner 14 and apertures 36 in brackets 32 cooperate with clips 38 to secure console mounting arrangement 12 in headliner 14.

Clips 38 mount or are attachable to the vehicle roof sheet metal (not shown) to secure console mounting arrangement 12 in position on the headliner. However, it is understood that the headliner and brackets may be provided with sufficient structural rigidity to support console mounting arrangement 12. Further, it is understood that rails, headliner and brackets may be joined by other well known methods, including welding and adhesives.

End caps 40 are secured to the forward and rearward ends 42, 44 of rails 26, 28. One or more openings 45 are formed in the end caps 40, allowing electrical conduit to extend through to rails 26, 28. End caps 40 assist in aligning rails 24, 26 assembled in channel 20 of headliner 14 to ensure that rails are parallel and properly spaced to receive one or more accessory modules 46. End caps 40 may also cooperate with cross brackets 32 to ensure alignment of rails 24, 26 in headliner 14.

Figure 3:
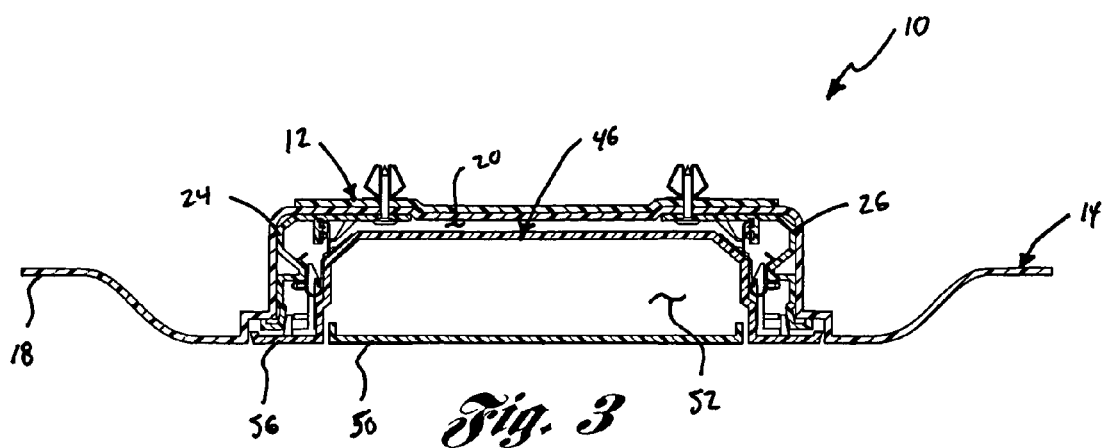
FIG. 3 is a cross-sectional view of the overhead console assembly along line 3—3 of FIG. 1.
Figure 4:
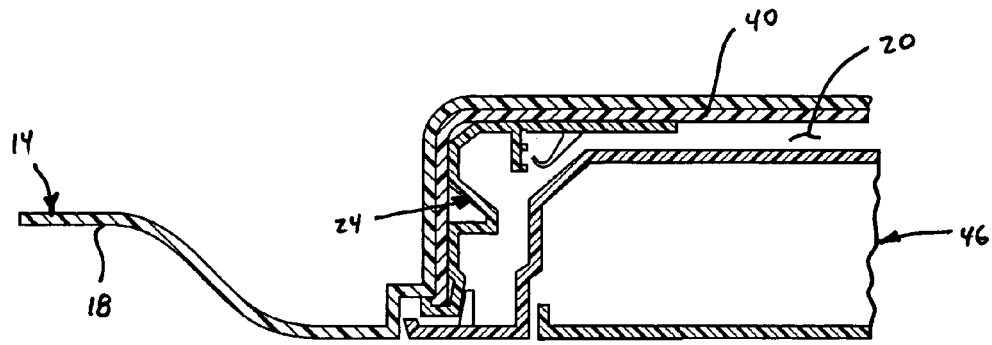
FIG. 4 is a cross-sectional view of an end portion of the overhead console assembly along line 4—4 of FIG. 1.
Figure 5:
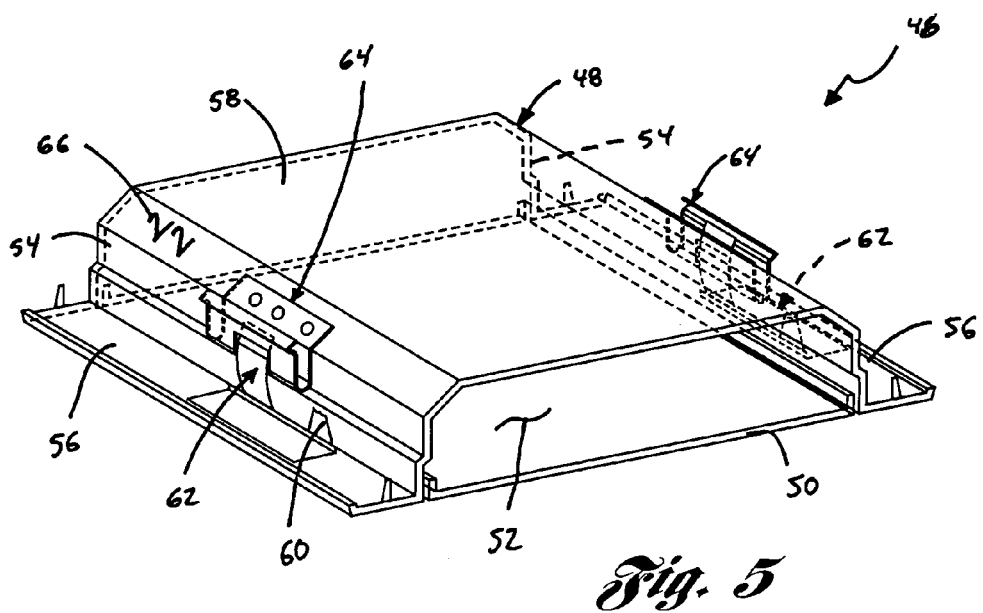
FIG. 5 is a perspective view of an accessory module configured for removable securement to the overhead console assembly.

Referring now to FIGS. 3–5, one or more accessory modules 46 are removably secured in console mounting arrangement 12 of modular overhead console assembly 10. Accessory module 46 is received between rails 24, 26 of console mounting arrangement 12. The channel 20 of headliner 14 is configured to position the lower surface of the accessory module 46 substantially flush with the lower surface 18 of headliner 14. End caps 40 positioned at each end of rails 24, 26 retain accessory modules 46 within channel 20.

As shown in FIGS. 3 and 5, accessory module 46 includes a module housing 48, a pivotally mounted door 50, and a storage area 52 defined therebetween. Module housing 48 includes a pair of sidewalls 54, flanges 56 extending from lower portions of each sidewall 54 and an upper wall 58. Accessory modules 46 may be configured to store a variety of materials within storage area 52. As is shown in FIG. 5, module 46 is configured to hold a variety of items, including compact discs jewel cases, a pair of sunglasses or the like. Door 50 pivotally mounts to the module housing 48 at hinges 60.

One or more latches 62 extend from each flange 56 of module housing 48 to releasably engage snap clips 64. In a preferred aspect of the present invention, a latch is provided on each flange of module housing. Latches may be integrally formed into module housing or joined by a variety of methods, including welding, adhesive or the like. Further, latches may extend from the sidewalls or upper wall of the module housing based on the securement location of the snap clips on the rails of console mounting arrangement. A description of the interconnection of flanges 56 with snap clips 64 will be discussed in greater detail below.

Accessory modules 46 may also receive electrical components requiring power or signal to operate, such as DVD video player or global position system (GPS) units. One or more electrical connectors 66 are molded or joined to the module housing 48. Connectors 66 are power contacts which, when placed in contact with electrically conductive strips or wires on the console mounting arrangement when the module is positioned in the mounting arrangement, provide power to the electrical components stored with module housing 48. In a preferred aspect of the present invention, a pair of electrical connectors are provided on each sidewall 54 of module housing 48. However, it is understood that the connectors may be positioned in a variety of locations on the module housing.

Figure 6:
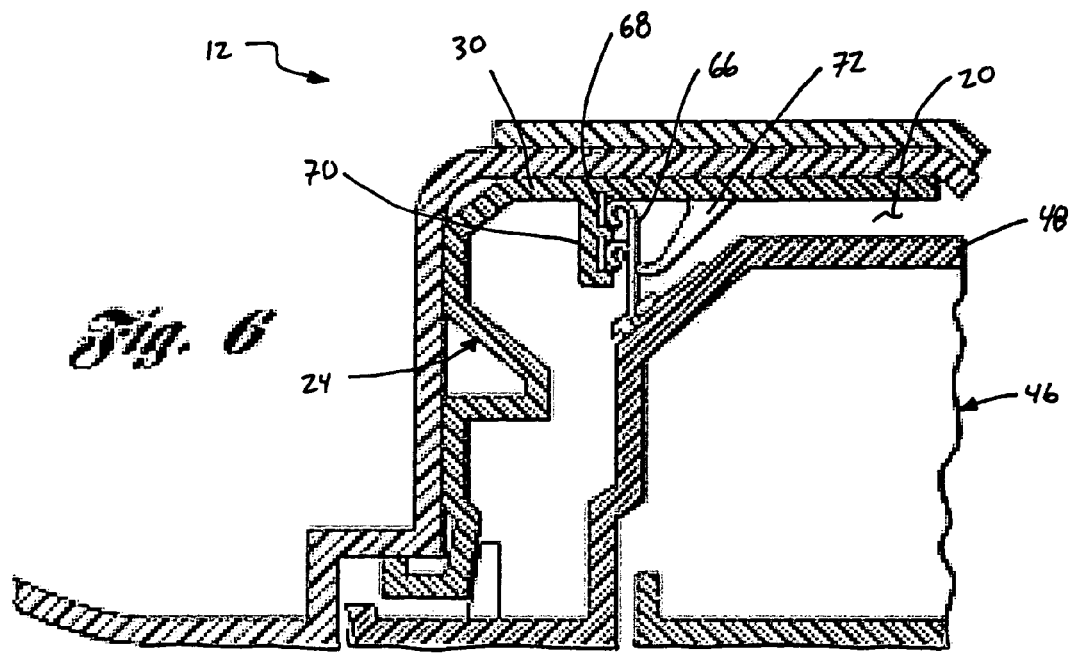
FIG. 6 is a cross-sectional view of a removable accessory module received in the overhead console mounting arrangement having an electrical contact arrangement along line 3—3 of FIG. 1.

Referring now to FIG. 6, at least one electrically conductive contact 68 extends along rail 24 adjacent the module housing 48 to provide a power connection for electronic devices disposed within accessory module 46. In a preferred aspect of the present invention, electric power or signals are supplied from a vehicle electrical system through a pair of electrically conductive contacts or wires 68 extending along an extrusion 70 from the upper wall 30 of rail 24. Electrically conductive contacts 68 are formed from flat round wire, printed circuit (PC) board or flex cable and extend between along rail 24. Contacts 68 are connected to the vehicle electrical system through conduit extending through opening 45 in end caps 40 illustrated in FIG. 2.

Contacts 68 are attached to extrusion 70 by molded in snaps or tabs. Alternatively, pressure sensitive adhesive (PSA) may be used to secure the contacts in position on the extrusion. When accessory module 46 is inserted into channel 20 of headliner 14 for securement to console mounting arrangement 12, electrical connectors 66 on module housing 48 extend toward contacts 68 on rail 24. A leg 72 moves connectors 66 into engagement with contacts 68 to supply power or signals to the accessory module 46 to ensure an optimum power connection. Leg 72 further protects contacts 68 when accessory module 46 is removed from console mounting arrangement 12.

Referring now to FIGS. 7–11, a description of the securement of the accessory module 46 to overhead console assembly 10 is discussed in greater detail. In a preferred aspect of the present invention, a pair of latches 62 extend upward from an upper surface of module housing 48. Latches may either be integrally formed into the module housing or formed as separate pieces joined to the housing by any suitable method, including fasteners, welding or adhesive. Each latch 62 includes a hinge or flange 60 configured to receive a door connecting member 74 which allows door to pivot between an open position and a closed position about axis 76.

Latch 62 includes a generally vertically extending pawl 78 having a connecting portion 80 and a tab 82. Connecting portion 80 is configured to extend through a window 84 in snap clip 64. Snap clip 64 includes one or mounting holes 86 adapted to receive fasteners (not shown) allowing securement of the clip 64 to the module housing 48. It is understood that the snap clip may be formed in various configurations and attached to the module housing by any suitable method, including welding or adhesive. A locking feature 88 on snap clip 64 receives and secures connecting portion 80 when pawl 78 is inserted through the window 84.

Figure 7:
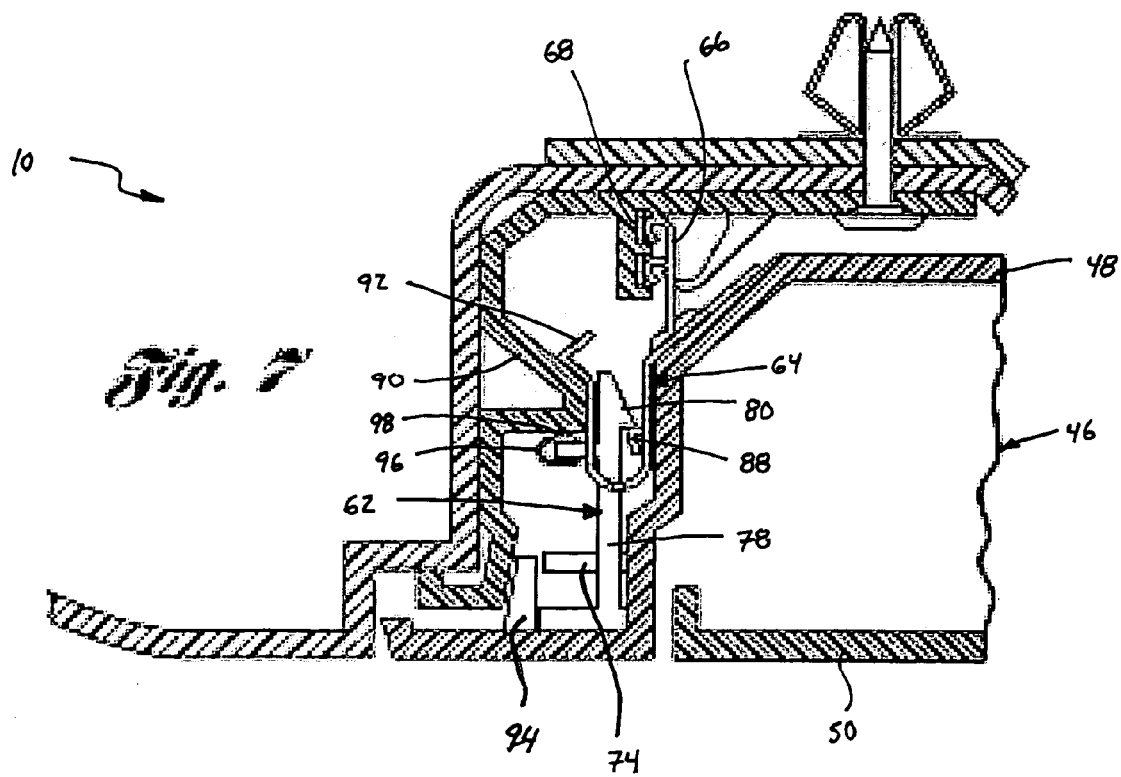
FIG. 7 is a cross-sectional view of a removable accessory module received within the overhead console assembly along line 3—3 of FIG. 1.
Figure 8:
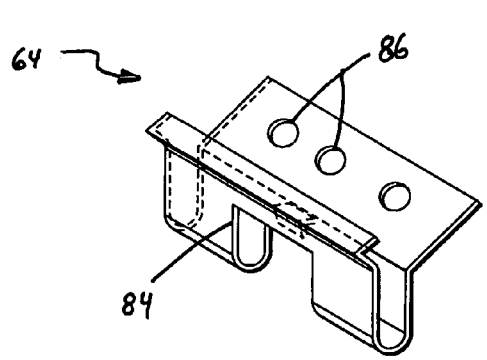
FIG. 8 is a perspective view of a snap clip securable to an accessory module.
Figure 9:
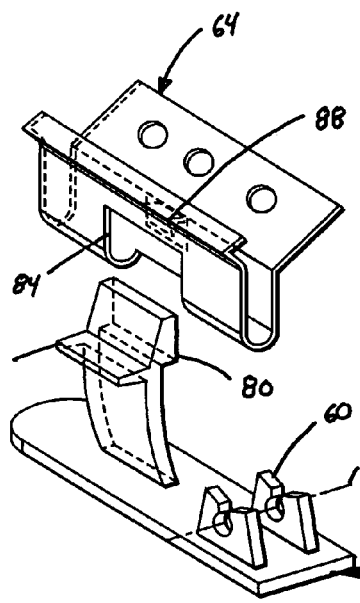
FIG. 9 is a perspective view of a latch and snap clip securement arrangement in accordance with the present invention.
Figure 10:
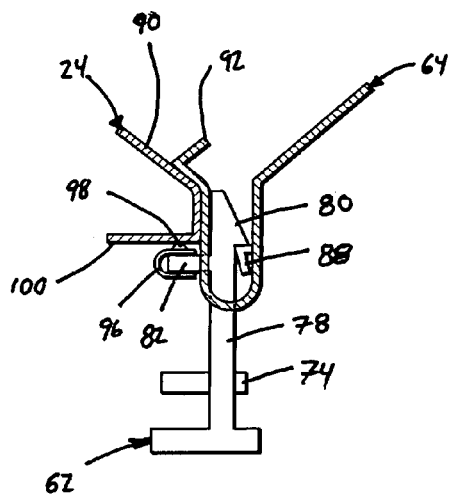
FIG. 10 is a side elevational view of the latch and snap clip securement arrangement.
Figure 11:
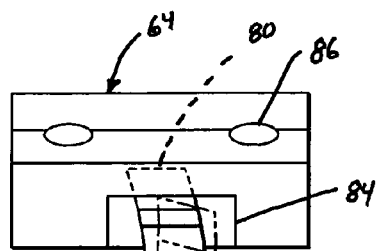
FIG. 11 is a side elevational view of a removable accessory module movable between a secured position and an unsecured position in the overhead console mounting arrangement in accordance with the present invention.

Referring now to FIGS. 7, 10 and 11, a description of the connection of the accessory modules 46 in the overhead console mounting arrangement 12 mounted in headliner 14 is provided. In one aspect of the present invention, latches 62 are incorporated into module housing 48 of accessory module 46. However, it is understood that latches 62 may extend from door 50 and perform the same function.

Rails 24 include an extension 90 configured to allow removable connection of one or more accessory modules 46 and position electrical connectors 66 on modules 46 adjacent electrical contacts 68 on rails 24. Module housing 48 including one or more snap clips 64 is inserted into channel 20 in headliner 14. Once inserted, a snap feature 92 on clips 64 engage an upper surface of rail extension 90. Snap feature 92 provides a temporary support surface or locking arrangement for module 46 on rails 24.

A ramp guide 94 provided on an upper surface of flange 56 cooperates with rails 24 to position module housing 48 in overhead console mounting arrangement 12. It is understood that module housing 48 and door 50 may be assembled together prior to insertion into the overhead console mounting arrangement 12. It is also contemplated that the module housing may have any suitable configuration to accomplish the same objective. For example, the lower flanges of the module housing may be incorporated as part of the pivoting door.

Door 50 extends between an open position generally perpendicular to the headliner 14 and a closed position wherein door 50 is received in housing 48. Storage area may be configured to receive and store a variety of items. For example, the storage area may include a storage pocket formed or attached to the door to retain sunglasses. Alternatively, the accessory module may be configured to store other materials such as tissue boxes, compact discs or garage door openers.

A drag clip 96 inserted over tab 82 on pawl 78 of latch 62 includes one or more teeth 98. Connecting portion 80 of latch 62 is inserted through window 84 in snap clip 64 and engages locking feature 88 to secure latch 62 to snap clip 64. Once secured, teeth 98 of drag clip 96 engage a lower portion 100 of rail extension 90 to restrict movement of the module housing 48 once secured to rails 24.

Users can easily align and move accessory modules 46 secured within overhead console mounting arrangement 12. As shown in FIG. 11, a user pulls down on latch 62, causing connecting portion 80 to disengage locking feature 88 of snap clip 64. The downward movement of latch 62 also disengages teeth 98 of drag clip 96 from the lower portion 100 of rail extension. Once disengaged, a user can adjust or remove the module housing within the overhead console mounting arrangement.

It is also understood that the accessory module mounting arrangement of the overhead console assembly of the present invention may include a removably mounted trim plate covering the channel in headliner where an accessory module is not positioned. The trim plate would be removably secured to the rails using a latch and snap clip mounting arrangement described above to provide a uniform appearance to the overhead console assembly disposed in the headliner of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overhead console assembly and headliner combination for use in a passenger compartment of a vehicle, the combination comprising:

a headliner having an upper surface and a lower surface having an elongated channel formed therein;

an overhead console mounting arrangement having opposing first and second rails securable to the elongated channel; and one or more accessory modules selectively positionable and removably attachable to the opposing first and second rails, the accessory module including a module housing, at least one clip extending from the module housing mountable to the opposing first and second rails and at least one latch releasably engaging the at least one clip to secure the accessory module to the overhead console mounting arrangement.

2. The combination of claim 1 further comprising a power connector arrangement disposed in at least one rail of the overhead console mounting arrangement.

3. The combination of claim 2 wherein the power connector arrangement further comprises at least one electrically conductive strip in communication with a vehicle electrical system disposed in at least one of the first and second rails and configured to supply power or electrical signals to the one or more accessory modules.

4. The combination of claim 3 wherein the power connector arrangement further comprises a pair of electrically conductive wires secured to each of the first and second rails.

5. The combination of claim 3 wherein the at least one electrically conductive strip is formed of flat wire.

6. The combination of claim 3 wherein the at least one electrically conductive strip is formed of printed circuit (PC) material.

7. The combination of claim 3 wherein the at least one electrically conductive strip is formed of a flexible cable or circuit.

8. The combination of claim 1 further comprising one or more brackets cooperating with the headliner to secure the first and second rails to the channel in the headliner.

9. The combination of claim 1 wherein the one or more accessory modules comprise a housing, a door pivotally mounted to the housing and a storage area defined within the housing configured to receive and store items.

10. The combination of claim 9 wherein the one or more modules further comprise a pair of latches extending from flanges on the module housing each having a connecting portion releasably securable to a pair of snap clips mounted on the module housing and engaging extensions on each of the opposing first and second rails to secure the accessory modules to the overhead console mounting arrangement.

11. The combination of claim 9 wherein the one or more accessory modules further comprise at least one electrical connector disposed on an outer surface of the module housing, wherein the at least one electrical connector engages the at least one electrically conductive strip on one of the opposing first and second rails to supply power or an electrical signal to a component mounted in the module housing.

12. The combination of claim 9 wherein the opposing first and second rails further comprise a leg which urge the at least one electrical connector into contact with the at least one electrically conductive strip on the opposing firsts and second rails.

13. The combination of claim 1 wherein the one or more accessory modules comprise a plurality of accessory modules mounted adjacent one another in the overhead console mounting arrangement.

14. An overhead console assembly for use with a vehicle having a headliner, the headliner having an upper surface and a lower surface having an elongated channel formed therein, the assembly comprising;
an overhead console mounting arrangement having opposing first and second rails securable to the elongated channel, wherein at least one of the first and second rails include a rail extension and a power connector arrangement in communication with a vehicle electrical system configured to supply power;
one or more accessory modules selectively positionable and removably attachable to the opposing first and second rails, the accessory module including a module housing, a door pivotally mounted to the housing, a storage area defined within the housing configured to receive and store items and at least one electrical connector disposed on an outer surface of the module housing configured to engage the power connector arrangement on one of the opposing first and second rails; and
an accessory module mounting arrangement having at least one clip extending from the module housing mountable to the opposing first and second rails and at least one latch releasably engaging the at least one clip to secure the accessory module to the overhead console mounting arrangement.

15. The assembly of claim 14 wherein the overhead console mounting arrangement further comprises one or more brackets cooperating with the headliner to secure the first and second rails to the channel in the headliner.

16. The assembly of claim 14 wherein the accessory module mounting arrangement further comprises a pair of latches extending from flanges on the module housing each having a connecting portion releasably securable to a pair of snap clips mounted on the module housing and engaging extensions on each of the opposing first and second rails to secure the accessory modules to the overhead console mounting arrangement.

17. The assembly of claim 14 wherein the power connection arrangement further comprises a pair of electrically conductive wires secured to each of the first and second rails and configured to supply power or electrical signals to the one or more accessory modules.

18. The assembly of claim 17 wherein the opposing first and second rails further comprise a leg which urge the at least one electrical connector into contact with the at least one electrically conductive strip on the opposing firsts and second rails.

19. The assembly of claim 14 wherein the one or more accessory modules comprise a plurality of accessory modules mounted adjacent one another in the overhead console mounting arrangement.

20. An overhead console assembly for use with a vehicle having a headliner, the headliner having an upper surface and a lower surface having an elongated channel formed therein, the assembly comprising;
an overhead console mounting arrangement having opposing first and second rails securable to the elongated channel, wherein each rail includes a rail extension and a pair of electrically conductive wires secured to each of the first and second rails configured to supply power;
one or more accessory modules selectively positionable and removably attachable to the opposing first and second rails, the accessory module including a module housing, a door pivotally mounted to the housing, a storage area defined within the housing configured to receive and store items and a pair of electrical connectors disposed on an outer surface of the module housing configured to engage the pair of electrically conductive wires on the opposing first and second rails; and
an accessory module mounting arrangement having a pair of latches extending from flanges on the module housing having a connecting portion releasably securable to a pair of snap clips mounted on the module housing and engaging extensions on each of the opposing first and second rails to secure the accessory modules to the overhead console mounting arrangement.

* * * * *